Oct. 9, 1923.
C. L. THOMPSON
CINEMATOGRAPHIC PROJECTOR
Original Filed March 11, 1920
1,470,404
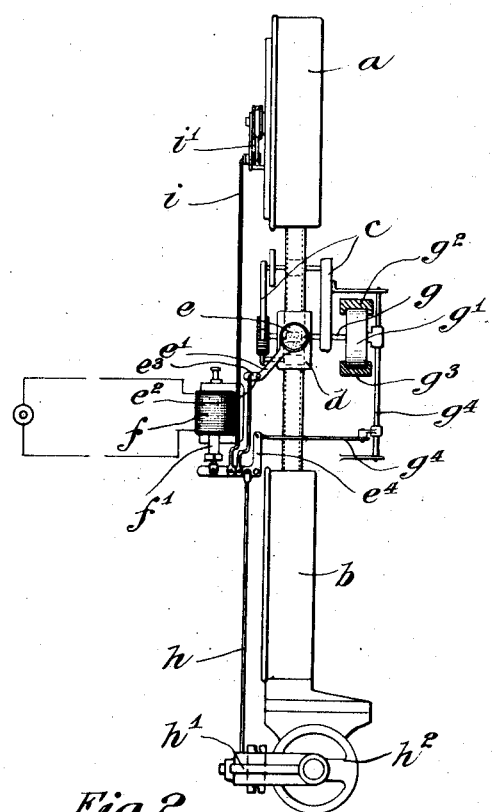
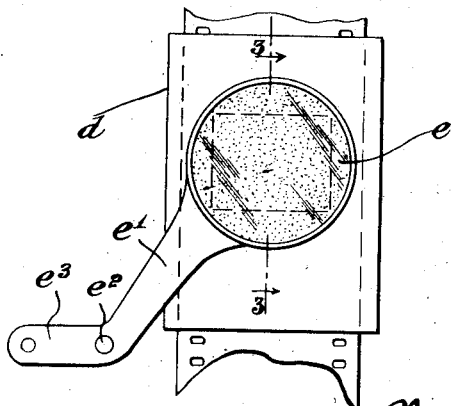

Patented Oct. 9, 1923.

1,470,404

UNITED STATES PATENT OFFICE.

CLARENCE L. THOMPSON, OF ELMHURST, NEW YORK, ASSIGNOR TO LYDIA B. KOCH, OF NEW YORK, N. Y.

CINEMATOGRAPHIC PROJECTOR.

Application filed March 11, 1920, Serial No. 365,032. Renewed July 27, 1923.

*To all whom it may concern:*

Be it known that I, CLARENCE L. THOMPSON, a citizen of the United States, residing at Elmhurst, in the borough of Queens, city of New York, county of Queens, and State of New York, have invented certain new and useful Improvements in Cinematographic Projectors, of which the following is a specification, reference being had therein to the accompanying drawings, which form a part thereof.

My invention relates to cinematographic projectors, and more particularly to a type thereof wherein means are provided to stop the film feeding mechanism to convert the moving image into a still image.

Heretofore projectors of this type have been used in connection with target structures, means being provided whereby the film will be stopped substantially simultaneously with the impact of a bullet with the screen. It has been necessary in such projectors, however, to use a low amperage lamp so as to permit this stoppage of the film and avoid danger of damage to, or ignition of, the film, as a result of the heat of the concentrated light rays.

In targets, sharp definition of the image upon the screen is neither necessary nor desirable, and the use of low amperage lamps has therefore proven highly satisfactory.

In educational work, however, a brilliantly illuminated screen with a clear definition of the image is essential, and the use of low amperage, incandescent lamps does not give satisfactory results. Heretofore, however, it has been found impossible to use high amperage arc lights in a projector mechanism so constructed as to permit the stoppage of the film.

With these conditions in mind, the object of my invention is to provide a cinematographic projector structure embodying therein a screen member adapted to be interposed between the film and the condenser of the lamp housing, which will intercept the infra red rays to an extent to reduce the volume of heat at the film sufficiently to permit the stoppage of the film without likelihood of the ignition of the film, while at the same time permitting the passage of a sufficient volume of light rays to ensure a fairly sharp, well defined image upon the screen while the film is at rest.

In the use of a projector made in accordance with my invention, it is desirable that this screen be automatically actuated by a mechanism coordinated with that mechanism which is operative to arrest movement of the film, so that said screen will become operative only during the interval while the film is at rest.

The invention consists primarily in a cinematographic projector embodying therein a screen having transparent areas and areas adapted to refract or absorb infra red rays of light; and in such other novel features of construction as are hereinafter set forth and described, and more particularly pointed out in the claims hereto appended.

Referring to the drawings,

Fig. 1 is a diagrammatic view of the film feeding and film control mechanism of a projector embodying my invention;

Fig. 2 is a detail enlarged view of the screen shown in relation to the lens opening of the film feeding housing; and Fig. 3 is a section on the line 3—3 of the screen shown in Fig. 2.

Like letters refer to like parts throughout the several views.

In the embodiment of my invention shown in the drawings, I have indicated at *a* the upper film magazine of a projector, and at *b* the lower magazine, the film feeding mechanism *c* being conventionally intermediate said magazines. The housing for said feeding mechanism and the projector lenses is indicated at *d*, this casing having the usual sight opening therein through which the light rays are directed from the condenser lenses, not shown, through the film to the projector lenses. Mounted adjacent said opening is a light screen *e* formed of glass or other refractory transparent substance which is adapted, with the stoppage of the film, to project across the sight opening in the housing *d* so as to be in the path of the light rays passing to the film and the projector lenses.

While in the accompanying drawings, I have illustrated a form of the invention in which the actuation of said screen *e* is controlled by the same mechanism as is used for stopping the feed of the film, it is apparent that, considering the invention in its broader aspect, any desired means for actuating said screen *e* may be employed.

In the form of the invention shown, the screen $e$ is carried by an oscillatory frame $e'$, pivoted at $e^2$ and having a crank arm $e^3$ connected with a bell crank lever $e^4$. The bell crank lever $e^4$, as will more fully appear hereinafter, is operatively connected with the core $f'$ of a solenoid $f$ and with the various other mechanisms in a machine, so as to simultaneously disconnect the projector from its source of power, develop a braking action on the main power shaft of the film feeding mechanism, and develop a braking action upon the spindle of the upper magazine $a$ so that all of these functions in the machine will be simultaneous.

The main driving shaft of the feeding mechanism is indicated at $g$ and has mounted thereon a fly wheel $g'$ controlled by a brake mechanism, the shoes of which are indicated at $g^2$ and $g^3$. The operative connections between said brake mechanism and the bell crank lever $e^4$ are shown at $g^4$.

The said lever $e^4$ is connected with the clutch mechanism $h'$ by means of which power is transmitted from the motor $h^2$ to the projector, by the link $h$, and is connected with a band brake $i'$ upon a drum carried by the spindle of the magazine $a$ by means of the link $i$. Said brake mechanism, said clutch mechanism and said spindle reel brake form no part of my present invention, but merely illustrate one form of machine in connection with which my invention may be used.

The screen $e$ is preferably formed of sheet glass, one surface of which is coated with gold dust which has the capacity of refracting or absorbing the infra red rays contained in the beam of light, so that the film is protected from the action of these rays which are responsible for the intense heat delivered at the film in a projector using an ordinary arc light. While the separation of these rays from the light passing to the film will have the effect of slightly dimming the reproduction on the screen, nevertheless sufficient light will pass through the screen $e$ to ensure a sufficient illumination of the reproduced image and a sufficiently sharp definition thereof for the purposes of the invention.

In the use of a projector made in accordance with my invention, while a moving image is being projected upon the illuminated screen, the screen $e$ will be held out of the path of the light rays so as to permit the entire volume of light to pass to the film.

In educational work with projectors of this type, it is essential that the lecturer have control of the feeding mechanism of the film, so that he may stop the projector at any instant in order to afford time for elaboration upon any particular subject appearing upon the screen. It is also necessary that the machine be so constructed that he may at will interpose the screen $e$ in the path of the beam of light passing from the lamp house to the film. In the form of the invention shown, I am enabled to secure both of these results by one and the same act of the lecturer, thus causing the simultaneous stoppage of the film and the interposition of said screen $e$ in the path of the light rays from the lamp. Hence when the film comes to rest, so as to present a still image upon the receiving screen, the light screen $e$ will be simultaneously so positioned as to prevent any of the infra red rays from passing to the film, thus permitting a continued illumination of the screen even though the image is converted from a moving image to a still image.

In the operation of the specific form of the invention shown in the drawings, the lecturer will either carry in his hand, or have positioned within reach, a switch mechanism included in the circuit to the solenoid $f$, so that by closing this circuit the core $f'$ of the solenoid will be raised and the bell crank lever $e^4$ will be oscillated, thus simultaneously setting the brake shoes $g^2$—$g^3$, disconnecting the motor $h^2$ from the main power shaft of the projector, setting the band brake $i'$ upon the spindle, of the magazine $a$, and oscillating the frame $e'$ carrying the light screen $e$, so as to bring said screen in the desired position with relation to the sight opening in the housing $d$.

Immediately with the interruption of the circuit to said solenoid, the core will drop through gravity, and cause a reversal of the movements heretofore described with relation to the several mechanisms of the machine. In this manner it is possible for the lecturer to stop the machine at will to convert the moving image into a still image, and to maintain the still image upon the screen for any desired length of time, tests having demonstrated that a light screen, as heretofore described, will absolutely eliminate any possibility of the ignition of the film as a result of its stoppage in the manner described.

It is apparent that the detailed construction of the projector apart from the light screen $e$, is immaterial to the invention, since such may be varied with different types of machines. If a hand operated machine be used, it is apparent that those characteristics essential to a motor driven projector, will be absent, and that the mechanism for actuating the light screen will require changes in design to adapt it to the hand driven projector.

It is therefore not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A cinematographic projector embodying therein in combination with a high amperage source of light, projector lenses, and a film feeding mechanism of a light screen adapted to be interposed between said source of light and said film feeding mechanism, having closely juxtaposed, transparent areas and areas adapted to refract or absorb infra red rays of light, actuating means for said light screen, means controlling said film feeding mechanism and operative connections between said means and said actuating means, whereby the screen will be interposed between said source of light and said film feeding mechanism, substantially simultaneously with the stoppage of said mechanism, and will be moved out of the path of the light when said last named means is actuated to permit the film feeding mechanism to actuate.

2. A cinematographic projector embodying therein in combination with a high amperage source of light, a projector lens, and a film feeding mechanism of a movable frame disposed between said source of light and said film feeding mechanism, having therein a light screen, actuating means for said frame whereby said light screen may be maintained out of, or interposed in the path of the light rays passing from said source of light to said lens, means controlling said film feedng mechanism and operative connections between said means and said actuating means, whereby the screen will be interposed between said source of light and said film feeding mechanism, substantially simultaneously with the stoppage of said mechanism, and will be moved out of the path of the light when said last named means is actuated to permit the film feeding mechanism to actuate.

3. A cinematographic projector embodying therein in combination with a high amperage source of light, a projector lens, and a film feeding mechanism of a movable frame disposed between said source of light and said film feeding mechanism, having therein a light screen, an electro magnet, means controlling the circuit thereto, operative connections between said magnet and said frame, whereby said light screen may be maintained out of, or interposed in the path of the light rays passing from said source of light to said lens, means operative upon said film feeding mechanism to arrest movement of the film, and operative connections between said last named mechanism and the connections between said magnet and said frame, whereby with the closing of the circuit to said magnet, said means operative upon said feeding mechanism will be actuated to arrest movement of the film, and will be released substantially simultaneously with the opening of the circuit to said magnet.

4. A cinematographic projector embodying therein in combination with a high amperage source of light, a projector lens, and a film feeding mechanism of a movable frame disposed between said source of light and said film feeding mechanism, having therein a light screen, means operative upon said film feeding mechanism to arrest movement of the film, operative connections between said last named mechanism and said frame, whereby said screen, simultaneously with the stoppage of the film, will be interposed in the path of the light rays, passing from said source of light to said lens, and will be moved therefrom simultaneously with the restarting of the film.

5. A cinematographic projector embodying therein in combination with a high amperage source of light, a motor driven film feeding mechanism and a projector lens of a movable frame, a light screen having transparent areas and areas adapted to refract and absorb infra red rays of light therein, means adapted to simultaneously disconnect said motor from said film feeding mechanism, and develop a braking action upon said mechanism, and operative connections between said last named means and said frame, whereby said screen, simultaneously with the stoppage of the film, will be interposed in the path of the light rays passing from said source of light to said lens, and will be moved therefrom simultaneously with the restarting of the film.

In witness whereof I have hereunto affixed my signature, in the presence of two subscribing witnesses, this 27th day of February, 1920.

CLARENCE L. THOMPSON.

Witnesses:
  HERMINA C. HALL,
  JEANNETTE LYNCH.